(12) United States Patent
Lim et al.

(10) Patent No.: US 8,896,791 B2
(45) Date of Patent: Nov. 25, 2014

(54) LIQUID CRYSTAL DISPLAY

(75) Inventors: Sang-Uk Lim, Yongin-si (KR); Oh Jeong Kwon, Hwaseong-si (KR); Kwang-Chul Jung, Seongnam-si (KR); Mee Hye Jung, Suwon-si (KR); Jae Hong Park, Seoul (KR); Sung-Jae Yun, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 29 days.

(21) Appl. No.: 13/616,793

(22) Filed: Sep. 14, 2012

(65) Prior Publication Data

US 2013/0265533 A1    Oct. 10, 2013

(30) Foreign Application Priority Data

Apr. 4, 2012    (KR) .......................... 10-2012-0035158

(51) Int. Cl.
    *G02F 1/1337*    (2006.01)

(52) U.S. Cl.
    CPC ............................. *G02F 1/133707* (2013.01)
    USPC ........................................................ 349/130

(58) Field of Classification Search
    None
    See application file for complete search history.

(56) References Cited

U.S. PATENT DOCUMENTS

| | | | |
|---|---|---|---|
| 2003/0206262 A1* | 11/2003 | Kim et al. ...................... 349/129 |
| 2004/0227887 A1* | 11/2004 | Kwag et al. .................... 349/139 |
| 2008/0284953 A1* | 11/2008 | Takahashi et al. .............. 349/98 |
| 2010/0182556 A1 | 7/2010 | Oh et al. |
| 2011/0051059 A1 | 3/2011 | Kang et al. |
| 2011/0122332 A1 | 5/2011 | Kubota et al. |
| 2011/0157531 A1 | 6/2011 | Suwa et al. |
| 2011/0170044 A1* | 7/2011 | Kim et al. ...................... 349/139 |
| 2011/0216276 A1 | 9/2011 | Yang et al. |
| 2011/0222004 A1 | 9/2011 | Kim |
| 2011/0222010 A1 | 9/2011 | Lee et al. |
| 2011/0222014 A1 | 9/2011 | Kim et al. |
| 2012/0281172 A1* | 11/2012 | Park et al. ...................... 349/123 |

FOREIGN PATENT DOCUMENTS

| | | |
|---|---|---|
| EP | 2360518 A1 | 8/2011 |
| KR | 1020090112849 A | 10/2009 |
| KR | 1020120124011 A | 11/2012 |

\* cited by examiner

*Primary Examiner* — Thanh-Nhan P Nguyen
(74) *Attorney, Agent, or Firm* — Cantor Colburn LLP

(57) ABSTRACT

A liquid crystal display includes: a first substrate; a pixel electrode on the first substrate; a second substrate which faces the first substrate; a common electrode on the second substrate; a liquid crystal layer between the first substrate and the second substrate; and a cross-shaped organic layer protrusion on the first substrate or the second substrate and overlapping the pixel electrode. The edge of the organic layer protrusion is protruded from the edge of the pixel electrode.

16 Claims, 19 Drawing Sheets

LIQUID CRYSTAL DISPLAY

This application claims priority to Korean Patent Application No. 10-2012-0035158 filed in the Korean Intellectual Property Office on Apr. 4, 2012, and all the benefits accruing therefrom under 35 U.S.C. §119, the entire contents of which are incorporated herein by reference.

BACKGROUND (a) Field

The invention relates to a liquid crystal display.

(b) Description of the Related Art

Liquid crystal displays ("LCDs") are widely used as one type of flat panel display. A liquid crystal display has two display panels on which field generating electrodes such as pixel electrodes and a common electrode are formed, and a liquid crystal layer that is interposed between the display panels. In the liquid crystal display, voltages are applied to the field generating electrodes so as to generate an electric field over the liquid crystal layer, and then the alignment of liquid crystal molecules of the liquid crystal layer is determined by the electric field. Accordingly, the polarization of incident light is controlled, thereby performing image display.

Among the LCDs, a vertical alignment ("VA") mode LCD, which aligns LC molecules such that long axes thereof are perpendicular to the display panels in the absence of an electric field, has been developed.

In the VA mode LCD, it is important to ensure a sufficient (e.g., wide) light viewing angle.

SUMMARY

The invention provides a liquid crystal display for preventing a decrease in aperture ratio of the liquid crystal display while having a wide viewing angle and a fast response speed.

One or more exemplary embodiment of a liquid crystal display according to the invention includes: a first substrate; a pixel electrode disposed on the first substrate; a second substrate facing the first substrate; a common electrode disposed on the second substrate; a liquid crystal layer interposed between the first substrate and the second substrate; and a cross-shaped organic layer protrusion on the first substrate or the second substrate and overlapping the pixel electrode. An edge of the cross-shaped organic layer protrusion protrudes further than an edge of the pixel electrode, in a plan view.

The cross-shaped organic layer protrusion may be on the first substrate and may be disposed under the pixel electrode.

The cross-shaped organic layer protrusion may be on the second substrate and may be disposed on the common electrode.

A first alignment layer on the first substrate and a second alignment layer on the second substrate may be further included. One of the liquid crystal layer, the first alignment layer and the second alignment layer may include a photoreactive material.

Long axes of the liquid crystal molecules of the liquid crystal layer may be approximately perpendicular to surfaces of the first substrate and the second substrate in the absence of an electric field which is applied to the liquid crystal layer.

The liquid crystal molecules of the liquid crystal layer may be pretilted in a direction parallel to a direction extending from a position at which two adjacent edges of the pixel electrode meet each other toward a center portion of the cross-shaped organic layer protrusion.

The pixel electrode may be divided into a plurality of sub-regions by the edge of the pixel electrode and the cross-shaped organic layer protrusion. In the sub-regions, the liquid crystal molecules of the liquid crystal layer may be pretilted in different directions.

The pixel electrode may have at least one cutout at a position where two adjacent edges of the pixel electrode meet, and the cutout may extend in a direction from the position where the two adjacent edges of the pixel electrode meet toward a center portion of the cross-shaped organic layer protrusion.

A width of the pixel electrode may gradually increase from the position where two adjacent edges of the pixel electrode meet toward the center portion of the pixel electrode.

According to one or more exemplary embodiment of the invention, the viewing angle of the liquid crystal display is wide, the response speed is fast, and the aperture ratio and the transmittance may be increased while increasing visibility thereof.

BRIEF DESCRIPTION OF THE DRAWINGS

The above and other advantages and features of this disclosure will become more apparent by describing in further detail exemplary embodiments thereof with reference to the accompanying drawings, in which.

DETAILED DESCRIPTION

Figure 1:
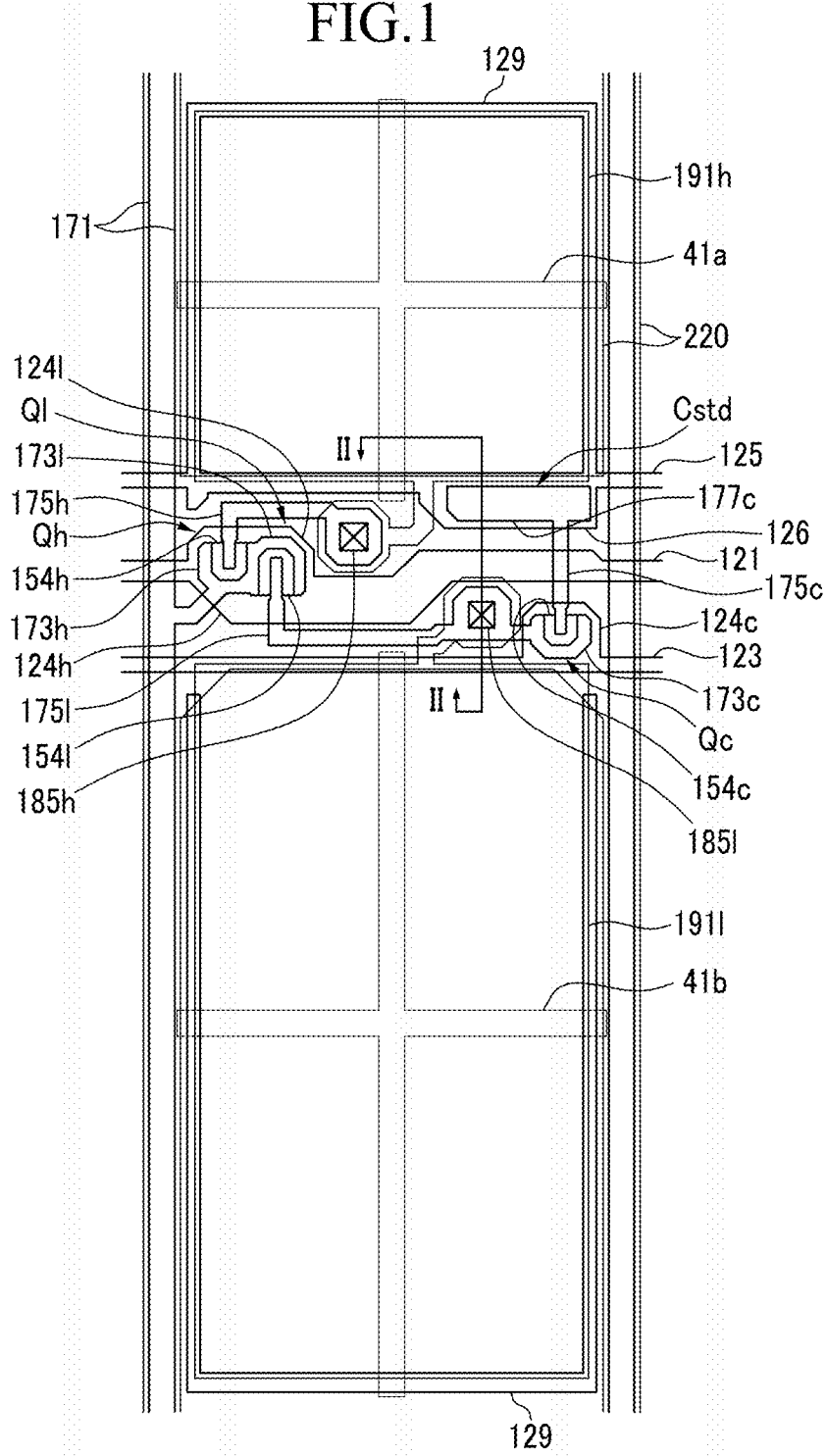
FIG. 1 is a plan view of an exemplary embodiment of a liquid crystal display according to the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" or "under" relative to other elements or features would then be oriented "upper" or "above" relative to the other elements or features. Thus, the exemplary term "under" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be described in detail with reference to the accompanying drawings.

To provide a sufficient (e.g., wide) viewing angle, a method of providing a cutout such as a micro-slit on a field generating electrode of a liquid crystal display ("LCD") is used. Cutouts and protrusions determine a tilt direction of LC molecules, such that a viewing angle may be increased by appropriately disposing the cutouts and protrusions to disperse the tilt directions of the LC molecules in various directions.

Where a plurality of branch electrodes are provided by forming a micro-slit in a pixel electrode, an open ratio of the LCD may be undesirably decreased.

Instead of forming a micro-slit in the pixel electrode, a slit may be formed in the common electrode. However, the slit in the common electrode may generate a misalignment between the common electrode and the pixel electrode, and an aperture ratio of the LCD may be undesirably decreased.

Figure 2:
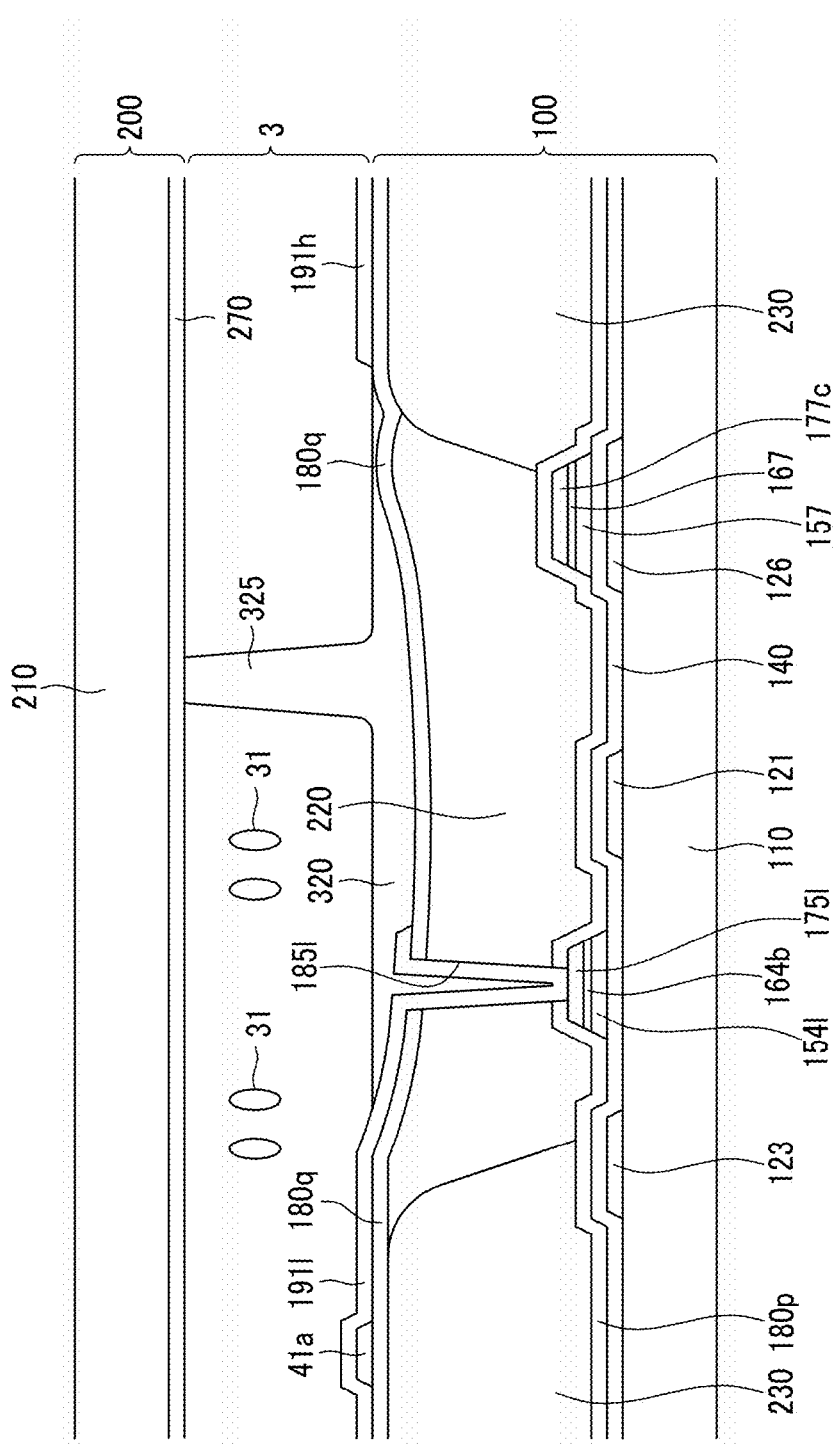
FIG. 2 is a cross-sectional view of the liquid crystal display of FIG. 1, taken along line II-II.
Figure 3:
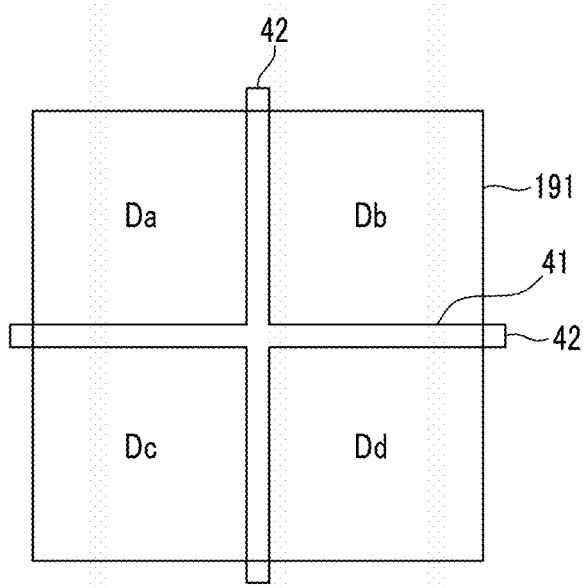
FIG. 3 is a top plan view of an exemplary embodiment of a basic region of a field generating electrode of a liquid crystal display according to the invention.

Now, an exemplary embodiment of a liquid crystal display according to the invention will be described with reference to FIG. 1. Firstly, an exemplary embodiment of a liquid crystal display according to the invention will be described with reference to FIG. 1 to FIG. 4. FIG. 1 is a plan view of an exemplary embodiment of a liquid crystal display according to the invention, FIG. 2 is a cross-sectional view of the liquid crystal display of FIG. 1 taken along line II-II, FIG. 3 is a top plan view of an exemplary embodiment of a basic region of a field generating electrode of a liquid crystal display according to the invention, and FIG. 4 is an equivalent circuit diagram of an exemplary embodiment of one pixel of the liquid crystal display according to the invention.

Figure 4:
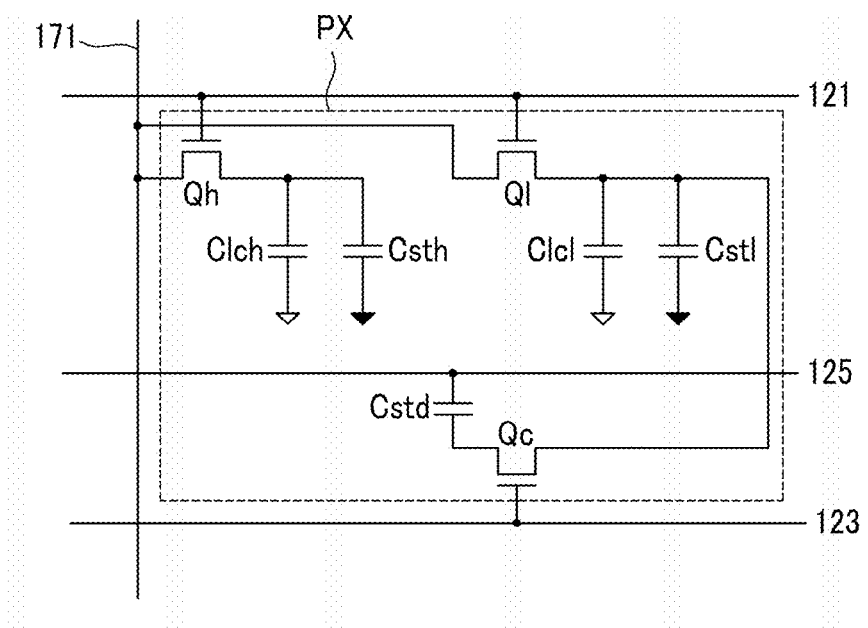
FIG. 4 is an equivalent circuit diagram of an exemplary embodiment of a pixel of a liquid crystal display according to the invention.

Referring to FIG. 4, an exemplary embodiment of a liquid crystal display according to the invention includes signal lines including a gate line 121, a storage electrode line 125, a step-down gate line 123 and a data line 171, and a pixel PX connected thereto.

The pixel PX includes first to third switching elements Qh, Ql and Qc, first and second liquid crystal capacitors Clch and Clcl, first and second storage capacitors Csth and Cstl, and a step-down capacitor Cstd. Here, the first switching element Qh and the first thin film transistor Qh, the second switching element Ql and the second thin film transistor Ql, and the third switching element Qc and the third thin film transistor Qc are denoted by the same reference numerals.

The first and second thin film transistors Qh and Ql are respectively connected to the gate line 121 and the data line 171, and the third thin film transistor Qc is connected to the step-down gate line 123.

The first and second thin film transistors Qh and Ql as three-terminal elements provided in a lower panel 100, have a control terminal connected to the gate line 121, an input terminal connected to the data line 171, and an output terminal connected to the first and second liquid crystal capacitors Clch and Clcl and to the first and second storage capacitors Csth and Cstl.

The third thin film transistor Qc as a three-terminal element provided in the lower panel 100, has a control terminal connected to the step-down gate line 123, an input terminal connected to the second liquid crystal capacitor Clcl, and an output terminal connected to the step-down capacitor Cstd.

The first and second liquid crystal capacitors Clch and Clcl are formed by overlapping first and second sub-pixel electrodes 191h and 191l connected to the first and second switching elements Qh and Ql, and a common electrode 270 of an upper panel 200 (see FIG. 2) to each other. The first and second storage capacitors Csth and Cstl are respectively formed by overlapping the storage electrode line 125 as well as a storage electrode 129 and first sub-pixel electrode 191h, and the storage electrode line 125 as well as a storage electrode 129 and the second sub-pixel electrode 191l.

The step-down capacitor Cstd is connected to the output terminal of the third thin film transistor Qc and the storage electrode line 125. The storage electrode line 125 provided in the lower panel 100 (see FIG. 2) and the output terminal of the third thin film transistor Qc overlap each other with an insulator disposed therebetween.

Next, the exemplary embodiment of the liquid crystal display according to the invention will be described in detail with reference to FIG. 1 and FIG. 2.

Referring to FIG. 1 and FIG. 2, the exemplary embodiment of the liquid crystal display according to the invention includes the lower panel 100 and the upper panel 200 facing each other, a liquid crystal layer 3 interposed between the two display panels 100 and 200, and a pair of polarizers (not shown) attached at outer surfaces of the display panels 100 and 200.

Now, the lower panel 100 will be described.

A plurality of gate conductors including a gate line 121, a step-down gate line 123, and a storage electrode line 125 are on an insulation substrate 110. The gate conductors may include a plurality of gate lines 121, a plurality of step-down gate lines 123 and a plurality of storage electrode lines 125.

The gate lines 121 and the step-down gate lines 123 transfer gate signals and have a longitudinal axis that mainly extends in a first direction, e.g., a transverse direction. Each gate line 121 includes a first gate electrode 124h and a second gate electrode 124l protruding upward and downward from a main portion of the gate line 121, in the plan view. Each step-down gate line 123 includes a third gate electrode 124c protruding upward from a main portion of the step-down gate line 123, in the plan view. The first gate electrode 124h and the second gate electrode 124l are continuous with and connected to each other, thereby forming one protrusion which protrudes from the main portion of the gate line 121.

The storage electrode lines 125 have a longitudinal axis that mainly extends in the transverse direction, and transfer a predetermined voltage such as a common voltage Vcom. Each storage electrode line 125 includes a storage electrode portion having a longitudinal axis extending according to at least one edge of the pixel electrodes 191h and 191l, the storage electrode 129 connecting ends of the storage electrode portion to each other, and a capacitive electrode 126 extending downward from a main portion of the storage electrode line 125.

A gate insulating layer 140 is on the gate conductors 121, 123 and 125.

A plurality of semiconductors 154h, 154l, 154c and 157 including hydrogenated amorphous silicon ("a-Si"), polysilicon or so on, is on the gate insulating layer 140. The semiconductors 154h, 154l and 154c include first and second semiconductors 154h and 154l extending toward the first and second gate electrodes 124h and 124l, respectively, and connected to each other, and a third semiconductor 154c connected to the second semiconductor 154l. A portion of the third semiconductor 154c is extended, thereby forming a fourth semiconductor 157.

A plurality of ohmic contacts 164b and 167 are on the semiconductors 154l and 157, respectively, a first ohmic contact (not shown) is on the first semiconductor 154h, and a third ohmic contact (not shown) is on the third semiconductor 154c. The third ohmic contact is extended, thereby forming the fourth ohmic contact 167.

A plurality of data conductors including a data line 171, a first drain electrode 175h, a second drain electrode 175l and a third drain electrode 175c is on the ohmic contacts 164l and 167. The data conductors may include a plurality of data lines 171, a plurality of first drain electrodes 175h, a plurality of second drain electrodes 175l and a plurality of third drain electrodes 175c.

The data lines 171 transmit data signals and have a longitudinal axis that extends in a second direction, e.g., a longitudinal direction, thereby intersecting the gate lines 121 and the step-down gate lines 123. Each data line 171 includes a first source electrode 173h and a second source electrode 173l extending toward the first gate electrode 124h and the second gate electrode 124l, respectively, and continuous with and connected to each other.

The first drain electrode 175h, the second drain electrode 175l and the third drain electrode 175c each include a first end portion having a wide planar area and a second end portion of a relative long, linear bar shape in the plan view. The bar-shaped second end portions of the first drain electrode 175h and the second drain electrode 175l are partially enclosed by the first source electrode 173h and the second source electrode 173l in the plan view. The wide first end portion of the second drain electrode 175l is further extended thereby forming the third source electrode 173c of a "U" shape in the plan view. A wide second end portion 177c of the third drain electrode 175c overlaps the capacitive electrode 126 thereby forming the step-down capacitor Cstd, and the bar end portion is partially enclosed by the third source electrode 173c.

The first, second and third gate electrodes 124h, 124l, and 124c, the first, second and third source electrodes 173h, 173l and 173c, and the first, second and third drain electrodes 175h, 175l and 175c respectively form the first, second and third thin film transistors ("TFT") Qh, Ql and Qc along with the first, second and third semiconductors 154h, 154l and 154c A channel of the TFT is respectively formed in the first, second and third semiconductors 154h, 154l and 154c between the first, second and third source electrodes 173h, 173l and 173c and the first, second and third drain electrodes 175h, 175l and 175c.

Also, the first, second and third semiconductors 154h, 154l, and 154c except for the channel region respectively between the first, second and third source electrodes 173h, 173l and 173c and the first, second and third drain electrodes 175h, 175l and 175c, have substantially the same planar shape as the data conductors 171, 175h, 175l and 175c and the ohmic contacts 164l and 167. That is, a semiconductor layer including the first, second and third semiconductors 154h, 154l, and 154c have a portion that is exposed without being covered by the data conductors 171, 175h, 175l and 175c, at a portion respectively between the first, second and third source electrodes 173h, 173l and 173c and the first, second and third drain electrodes 175h, 175l and 175c.

A lower passivation layer 180p including an inorganic insulator such as silicon nitride or silicon oxide is on the data conductors 171, 175h, 175l and 175c and on the exposed first, second and third semiconductors 154h, 154l and 154c.

A color filter 230 is on the lower passivation layer 180p. The color filter 230 is in most regions of a pixel PX except for areas including the first thin film transistor Qh, the second thin film transistor Ql and the third thin film transistor Qc, but is not limited thereto or thereby. Alternatively, the color filter 230 may be in the upper panel 200 and may be elongated in a space in the longitudinal direction between neighboring data lines 171. Each color filter 230 may display one of primary colors such as three primary colors of red, green and blue, but is not limited thereto or thereby.

A light blocking member 220 is on a region of the pixel PX in areas excluding the color filter 230 and on a portion of the color filter 230. The light blocking member 220 may otherwise be referred to as a black matrix, and reduces or effectively prevents light leakage. The light blocking member 220 includes portions having a longitudinal axis extended upward and downward with respect to the main portion of the gate line 121 and the step-down gate line 123, in the plan view. The light blocking member 220 includes a first light blocking member (not shown) covering a region including the first thin film transistor Qh, the second thin film transistor Ql and the third thin film transistor Qc, and a second light blocking member (not shown) extending according to the data line 171. A height of a portion of the light blocking member 220 may be less than a height of the color filter 230 taken from a common reference point, such as an upper surface of the insulation substrate 110.

An upper passivation layer 180q is on the color filter 230 and the light blocking member 220. The upper passivation layer 180q reduces or effectively prevents peeling of the color filter 230 and the light blocking member 220, and suppresses contamination of the liquid crystal layer 3 by an organic material of the solvent that inflows from the color filter 230 during a manufacturing operation of the LCD, so that the upper passivation layer 180q reduces or effectively prevents defects such as afterimages that may occur when the LCD is driven and an image is displayed.

The lower passivation layer 180p, the light blocking member 220 and the upper passivation layer 180q includes a plurality of first contact holes 185h and a plurality of second contact holes 185l extended through thicknesses thereof. The first contact holes 185h expose the wide second end portion of the first drain electrode 175h, and the second contact holes 185l expose the wide second end portion of the second drain electrode 175l.

A plurality of organic layer protrusions 41a and 41b are on the upper passivation layer 180q. In the plan view, the organic layer protrusions 41a and 41b may have a cross shape. The organic layer protrusions 41a and 41b include a first organic layer protrusion 41a and a second organic layer protrusion 41b.

A plurality of pixel electrodes 191 are on the upper passivation layer 180q and on the first and second organic layer protrusions 41a and 41b.

Referring to FIG. 1, each pixel electrode 191 may include the first sub-pixel electrode 191h and the second sub-pixel electrode 191l, but the invention is not limited thereto or thereby. The first and second sub-pixel electrodes 191h and 191l are separated from each other in the plan view with two gate lines 121 and 123 therebetween, and are respectively disposed in an upper and lower portion of a pixel area to be adjacent in the longitudinal (e.g., column) direction.

The first organic layer protrusion 41a overlaps the first sub-pixel electrode 191h, and the second organic layer protrusion 41b overlaps the second sub-pixel electrode 191l. The distal end portions of the first and second organic layer protrusions 41a and 41b are protruded further than outer edges of the first sub-pixel electrode 191h and the second sub-pixel electrode 191l, respectively.

The first sub-pixel electrode 191h and the second sub-pixel electrode 191l receive a data voltage through the first contact hole 185h and the second contact hole 185l from the first drain electrode 175h and the second drain electrode 175l, respectively. The first sub-pixel electrode 191h and the second sub-pixel electrode 191l to which the data voltage is applied, generate an electric field in conjunction with the common electrode 270 of the upper panel 200 which may be otherwise referred to as a common electrode panel 200, to determine a direction of liquid crystal molecules 31 of the liquid crystal layer 3 between the two electrodes 191 and 270. As described above, according to the determined direction of liquid crystal molecules 31, the luminance of light that passes through the liquid crystal layer 3 is changed.

The first sub-pixel electrode 191h and the common electrode 270 form the first liquid crystal capacitor Clch in conjunction with the liquid crystal layer 3 therebetween, and the second sub-pixel electrode 191l and the common electrode 270 form the second liquid crystal capacitor Clcl in conjunction with the liquid crystal layer 3 therebetween, so that the applied voltage is maintained even though the first and second thin film transistors Qh and Ql are turned off.

The first and second sub-pixel electrodes 191h and 191l overlap the storage electrode 129 and the storage electrode line 125 to form the first and second storage capacitors Csth and Cstl, respectively, and the first and second storage capacitors Csth and Cstl strengthen the voltage maintaining ability of the first and second liquid crystal capacitors Clch and Clcl.

The capacitive electrode 126 and the wide end 177c of the third drain electrode 175c overlap the gate insulating layer 140 and semiconductor layers 157 and 167 therebetween to form the step-down capacitor Cstd. In another exemplary embodiment of the invention, the semiconductor layers 157 and 167 that are disposed between the capacitive electrode 126 and the expansion 177c of the third drain electrode 175c collectively forming the step-down capacitor Cstd, may be eliminated.

A colored member 320 is on the upper passivation layer 180q. The colored member 320 is disposed on the light blocking member 220. The colored member 320 may include one of a first colored member and a second colored member. The first colored member (not shown) may extend upward and downward in the plan view with respect to the gate line 121 and the step-down gate line 123 to cover the gate line 121 and the step-down gate line 123, may extend to cover a region including the first thin film transistor Qh, the second thin film transistor Ql and the third thin film transistor Qc, and may extend according to the first light blocking member The second colored member (not shown) may extend according to the second light blocking member extended according to the data line 171.

The colored members 320 compensate the height difference between the light blocking member 220 and the color filter 230, and thereby a cell gap of the liquid crystal layer 3 disposed on the color filter 230 and the liquid crystal layer 3 disposed on the light blocking member 220 is substantially uniform while reinforcing a function of reducing or effectively preventing the light leakage by the light blocking member 220. Since the colored members 320 compensate the height difference between the light blocking member 220 and the color filter 230, the light leakage at the edge portion of the pixel electrode 191 due to inaccurate control of the liquid crystal molecules 31 disposed between the light blocking member 220 and the color filter 230 proximate to the step between the light blocking member 220 and the color filter 230, may be reduced or effectively prevented. Also, since the cell gap on the light blocking member 220 is reduced, the average cell gap is reduced, and thereby an amount of liquid crystal of the LCD may be reduced.

The upper panel 100 may further include a lower alignment layer (not shown) on the pixel electrode 191, the exposed upper passivation layer 180q and the colored member 320. The lower alignment layer may include a vertical alignment layer, and may be an alignment layer that is light-aligned by using a light-polymerized material.

Now, the upper panel 200 will be described.

The common electrode 270 is on an insulation substrate 210. The upper panel 200 may further include an upper alignment layer (not shown) on the common electrode 270. The upper alignment layer may include a vertical alignment layer, and may be an alignment layer including a light-reactive material.

A polarizer (not shown) may be provided on the outer surface of the two display panels 100 and 200. Transmissive axes of the two polarizers may be orthogonal to each other and one transmissive axis of the two polarizers may be substantially parallel to the gate line 121. Alternatively, a polarizer may be on one outer surface of the two display panels 100 and 200.

The liquid crystal layer 3 includes the liquid crystal molecules 31 having negative dielectric anisotropy. The liquid crystal layer 3 may include a polymer. The liquid crystal molecules 31 may be aligned so that long axes thereof are vertical (e.g., perpendicular) with respect to the surface of the two display panels 100 and 200 in a state in which there is no electric field. The liquid crystal molecules 31 may be initially arranged to have a pretilt such that long axes of the liquid crystal molecules 31 are arranged to be approximately parallel to certain directions because of fringe fields generated by the plurality of organic layer protrusions 41a and 41b and the edge of the sub-pixel electrodes 191h and 191l. The certain directions may be defined from four points where two adjacent edges of each sub-pixel electrode 191h and 191l extending in the different directions meet each other, and toward a center portion of the organic layer protrusion 41a and 41b having the cross shape. Thus, each pixel area may have four sub-regions of which pretilt directions of liquid crystals are different from each other. Accordingly, incident light cannot pass through a crossed polarizer of the liquid crystal display, and is thus blocked in a state in which there is no electric field.

As described above, the first sub-pixel electrode 191h and the second sub-pixel electrode 191l respectively applied with the data voltage generate the electric field together with the common electrode 270 of the common electrode panel 200 so that the liquid crystal molecules 31 of the liquid crystal layer 3, which are initially aligned so as to be vertical to the surfaces of the two electrodes 191 and 270 while the electric field is not applied, are inclined in a horizontal direction to the surfaces of the two electrodes 191 and 270, and the luminance of the light transmitting through the liquid crystal layer 3 varies according to the inclined degree of the liquid crystal molecules 31.

According to another exemplary embodiment of the invention, the liquid crystal display may further include a spacer 325 to maintain the cell gap between the two display panels 100 and 200. The spacer 325 may be continuous with the colored member 320 so as to form a single, unitary indivisible member. In an exemplary embodiment of a method of forming the liquid crystal display, the spacer 325 may be simultaneously formed with the colored member 320, and/or may be formed in a same layer of the LCD or be a same layer as the colored member 320.

Next, an exemplary embodiment of a basic region of the field generating electrode of a liquid crystal display according to the invention will be described with reference to FIG. 3.

As shown in FIG. 3 together with FIG. 1 and FIG. 2, the basic region of the field generating electrode includes the common electrode 270, an organic layer protrusion 41 and a pixel electrode 191. The common electrode 270 is not separately shown in FIG. 3 for convenience of explanation. In the plan view of the liquid crystal display from, the basic region defined by the organic layer protrusion 41 and the edges of the pixel electrode 191 may be divided into a plurality of sub-regions Da, Db, Dc and Dd, and the plurality of sub-regions may be symmetrical to each other with respect to the organic layer protrusion 41.

As described above, the organic layer protrusion 41 may have the cross shape in the plan view, and end portions 42 of the organic layer protrusion 41 protrude further than corresponding edges of the pixel electrode 191. An effect of the fringe field is stably applied up to the edge of the pixel area by the end portions 42 of the organic layer protrusion 41 protruding further than the edge of the pixel electrode 191 such that the arrangement of the liquid crystal molecules 31 may be controlled in a desired direction even at the edge of the pixel area.

The organic layer protrusion 41 includes portions having a longitudinal axis extending in the longitudinal direction and portions having a longitudinal axis extending in the transverse direction of the plan view. A width of the organic layer protrusion 41 is taken perpendicular to the respective longitudinal axis, and may be about 2 microns (μm) to about 10 μm. A height of the organic layer protrusion 41 is taken in a direction orthogonal to both the longitudinal and transverse directions, and may be about 1 μm to about 2 μm. A taper angle between a side surface and a lower surface of the organic layer protrusion 41 may be 45 degrees to 90 degrees, for example, taken in a cross-sectional or thickness view of the liquid crystal display.

In the exemplary embodiment of a liquid crystal display according to the invention, by using the fringe field by the edge of the pixel electrode 191 and the organic layer protrusion 41, the liquid crystal molecules 31 may be arranged to have the pretilt with the different directions. Accordingly, compared with a case of the pixel electrode of the liquid crystal display including a plurality of micro-slits, the aperture ratio of the exemplary embodiment of the liquid crystal display may be increased. Also, compared with a case of forming slits in the common electrode, there is no production yield decrease due to a misalignment of the slits of the common electrode and the pixel electrode, and the reduction of the aperture ratio caused by the slits in the common electrode may be decreased.

The exemplary embodiment of the organic layer protrusion of the liquid crystal display is under the pixel electrode as illustrated in FIG. 2, in an alternative exemplary embodiment of the invention, an organic layer protrusion may be on the common electrode.

Next, an exemplary embodiment of a driving method of the liquid crystal display of FIG. 1 and FIG. 2 will be described with reference to FIG. 4 along with FIG. 1 and FIG. 2.

If the gate line 121 is applied with a gate-on signal, the first switching element Qh and the second switching element Ql connected thereto are turned on. Accordingly, the data voltage applied to the data line 171 is applied to the first sub-pixel electrode 191h and the second sub-pixel electrode 191l through the turned on first switching element Qh and second switching element Ql. At this time, the data voltages applied to the first sub-pixel electrode 191*h* and the second sub-pixel electrode 191*l* have the same magnitude. Accordingly, the voltages charged to the first and second liquid crystal capacitors Clch and Clcl are the same.

If the gate line 121 is applied with a gate-off signal and the step-down gate line 123 is applied with the gate-on signal, the first switching element Qh and the second switching element Ql are turned off and the third switching element Qc is turned on. Thus, the charged voltage is moved from the second sub-pixel electrode 191*l* to the step-down capacitor Cstd through the third switching element Qc. Thus, the charged voltage of the second liquid crystal capacitor Clcl is decreased and the step-down capacitor Cstd is charged. The charged voltage of the second liquid crystal capacitor Clcl is decreased by the capacitance of the step-down capacitor Cstd such that the charged voltage of the second liquid crystal capacitor Clcl is lower than the charged voltage of the first liquid crystal capacitor Clch.

At this time, the charged voltages of two liquid crystal capacitors Clch and Clcl represent different gamma curves, and the gamma curve of one pixel voltage is a combination curve of the different gamma curves. A front side combination gamma curve coincides with a reference gamma curve at the optimally-determined front side of the liquid crystal display, and a lateral gamma curve approximates the front reference gamma curve. In this way, the image data are converted so that the lateral visibility of the liquid crystal display is improved.

As described above, the liquid crystal layer 3 between the lower panel 100 and the upper panel 200 includes the liquid crystal molecules 31 having negative dielectric anisotropy, and may further include the polymer.

Figure 5:
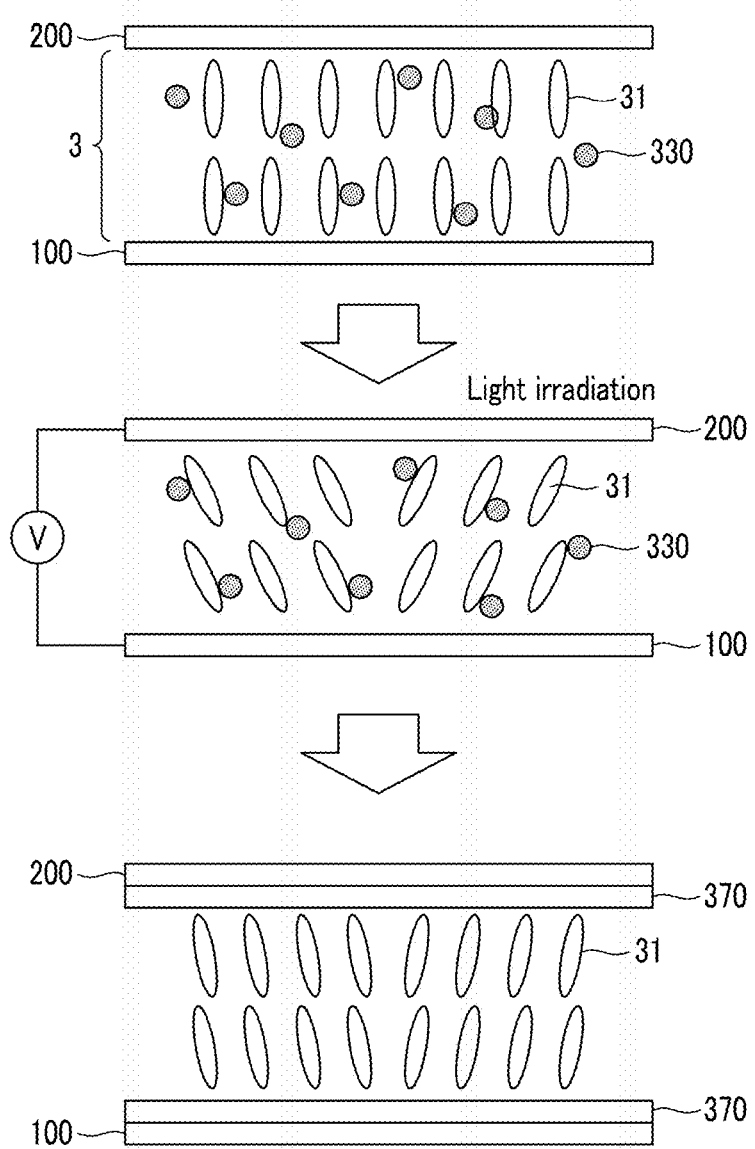
FIG. 5 shows views illustrating a process for allowing liquid crystal molecules to have a pretilt by using a prepolymer which is polymerized by light such as ultraviolet rays.
Figure 6A:
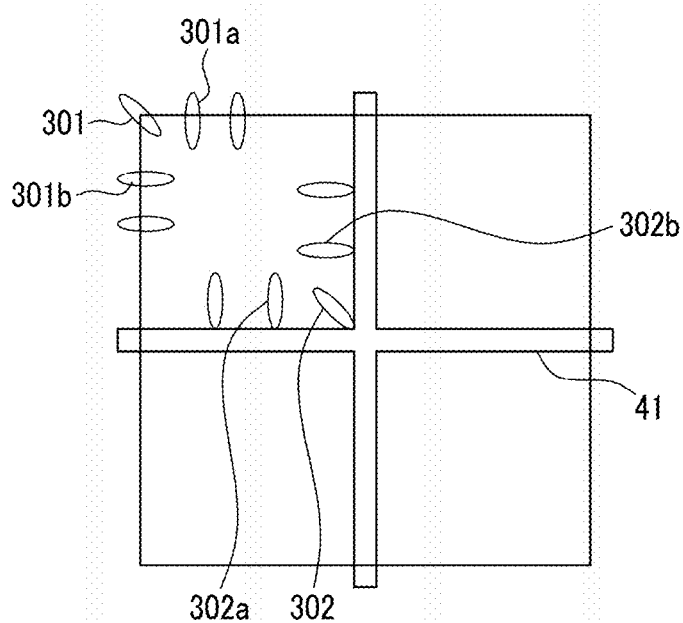
FIGS. 6A and 6B are views conceptually showing a liquid crystal direction in an exemplary embodiment of a basic region of a field generating electrode of a liquid crystal display according to the invention.
Figure 6B:
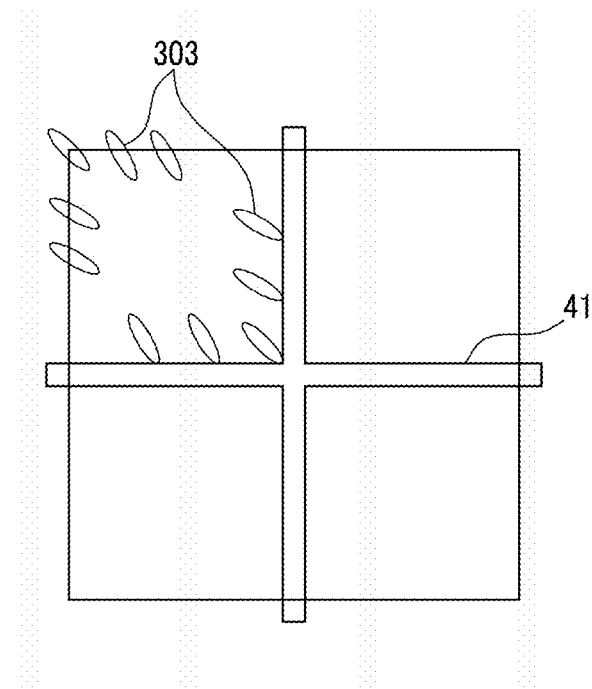

Next, an exemplary embodiment of an initial alignment method for providing pretilt to the liquid crystal molecules of the liquid crystal layer will be described with reference to FIG. 5, FIG. 6A and FIG. 6B. FIG. 5 shows a view illustrating an exemplary embodiment of a process for allowing liquid crystal molecules to have a pretilt by using a prepolymer which is polymerized by light such as ultraviolet rays, and FIGS. 6A and 6B are views conceptually showing an exemplary embodiment of a liquid crystal direction in a basic region of a field generating electrode of a liquid crystal display according to the invention.

Referring to the first view in FIG. 5, prepolymers 330 such as a monomer that is polymerized by light such as ultraviolet rays are injected along with a liquid crystal material between the two display panels 100 and 200. In one exemplary embodiment, the prepolymer 330 may be included in an alignment layer (not shown) on the two panels 100 and 200 as well as with the liquid crystal layer 3. The prepolymer 330 may be a reactive mesogen that is polymerized by light such as ultraviolet rays.

Referring to the second view in FIG. 5, the data voltage is applied to the first and second sub-pixel electrodes 191*h* and 191*l* of the lower panel 100 and the common voltage is applied to the common electrode 270 of the upper panel 200 to form an electric field on the liquid crystal layer 3 between the two panels 100 and 200. Then, the liquid crystal molecules 31 of the liquid crystal layer 3 respond to a fringe field to be tilted approximately parallel to certain directions by the fringe field by the organic layer protrusion 41 and the edge of the respective sub-pixel electrode 191*h* and 191*l*. The certain directions extend from four points at which two adjacent edges of the respective sub-pixel electrode 191*h* and 191*l* meet each other, and toward a center portion of the organic layer protrusion 41 having the cross shape. Thus, the tilt directions of the liquid crystal molecules 31 becomes four different directions in one basic region of the field generating electrode.

In this regard, a description will be given with reference to FIGS. 6A and 6B. With reference to FIG. 6A, directors 301*a* and 301*b* of the liquid crystal molecules at the portion adjacent to the edge of the pixel electrode 191 of the basic region of the field generating electrode meet the edge of the pixel electrode 191 at a predetermined angle, such as being perpendicular to the edge of the pixel electrode 191. In addition, directors 302*a* and 302*b* of the liquid crystal molecules at the portion adjacent to longitudinal portions of the organic layer protrusion 41 of the basic region of the field generating electrode are perpendicular to the organic layer protrusion 41. Directors 301 at a point where two adjacent edges of the pixel electrode 191 meet and directors 302 at a point where the longitudinal portions of the organic layer protrusion 41 meet, form an angle with the edges and the longitudinal portions, respectively.

Likewise, liquid crystal directors according to the fringe field generated by the edge of the pixel electrode 191 of the basic region of the field generating electrode, a cutout 91 (see FIG. 10) of the pixel electrode 191 and the organic layer protrusion 41 are firstly determined. The liquid crystal directors are secondly arranged in a direction for allowing the liquid crystal molecules to meet each other to minimize deformation, and the secondary arrangement direction becomes a vector sum direction of directions of the directors.

Accordingly, finally, as illustrated in FIG. 6B, the liquid crystal directors 303 become almost parallel to the certain four directions each extending from points at which two edges of the pixel electrode 191 extending in different directions meet and toward the center portion of the organic layer protrusions 41 having the cross shape.

The directors of the liquid crystal molecules 31 according to the fringe field are similarly arranged within each of the sub-regions Da, Db, Dc and Dd, and the tilt direction of the liquid crystal molecules in each basic region of the field generating electrode becomes four directions. Specifically, referring to the sub-regions Da, Db, Dc and Dd indicated in FIG. 3, the directors of the liquid crystal molecules 31 may be obliquely arranged in a right and downward direction from the pixel edge toward the center portion of the organic layer protrusion 41 in the first region Da, the directors of the liquid crystal molecules 31 may be obliquely arranged in a left and downward direction from the pixel edge toward the center portion of the organic layer protrusion 41 in the second region Db, the directors of the liquid crystal molecules 31 may be obliquely arranged in a right and upward direction from the pixel edge toward the center portion of the organic layer protrusion 41 in the third region Dc, and the directors of the liquid crystal molecules 31 may be obliquely arranged in a left and upward direction from the pixel edge toward the center portion of the organic layer protrusion 41 in the fourth region Dd.

Referring to the third view in FIG. 5, when the electric field is formed in the liquid crystal layer 3 while the light such as ultraviolet rays is irradiated onto the liquid crystal layer 3 including the prepolymer 330, the prepolymer 330 is polymerized, thereby forming a polymer 370. The polymer 370 is formed to contact the display panels 100 and 200. If the prepolymer 330 is included in the alignment layer, the prepolymer 300 of the alignment layer is polymerized such that the polymer 370 is formed in the alignment layer. The liquid crystal molecules 31 are aligned with pretilts in the alignment direction determined by the polymer 370. Accordingly, the liquid crystal molecules 31 are aligned with pretilts in four different directions even though no voltage is applied to the field generating electrodes 191 and 270.

In the exemplary embodiment of the liquid crystal display according to the invention, by using the fringe field at the edge of the pixel electrode 191 and at the organic layer protrusion 41, the liquid crystal molecules may be arranged to have the pretilt with the different directions. Accordingly, compared with a case of forming a plurality of micro-slits in the pixel electrode of the liquid crystal display, an aperture ratio of the liquid crystal display may be increased. Also, compared with a case of forming slits in the common electrode, there is no production yield decrease due to a misalignment of the slits of the common electrode and the pixel electrode, and the reduction of the aperture ratio by the slits formed in the common electrode may be decreased.

As described above, the number of basic regions of the field generating electrode within in each pixel area may be changed according to a size of the pixel or other conditions.

Now, referring to Table 1, transmittance of experimental examples of a liquid crystal display according to the invention will be described. FIG. 9A to FIG. 9L are plan views of an arrangement direction of liquid crystal directors of experimental examples of a liquid crystal display according to the invention.

In the experimental examples, while controlling the width of the organic layer protrusion and the taper angle with respect to the lower surface, the transmittance is measured and compared to transmittance of a liquid crystal display including a conventional pixel electrode having the micro-slits, to determine a relative transmittance in percent (%) and the results thereof are represented in Table 1 below.

TABLE 1

|  | Change according to protrusion height | | | Change according to protrusion width | | | | Change according to a taper angle | | |
| --- | --- | --- | --- | --- | --- | --- | --- | --- | --- | --- |
| Protrusion width (um) | 5 | 5 | 5 | 3 | 5 | 7.5 | 10 | 5 | 5 | 5 |
| Protrusion height (um) | 1.0 | 1.5 | 2.0 | 1.5 | 1.5 | 1.5 | 1.5 | 1.5 | 1.5 | 1.5 |
| Taper angle (degrees) | 70 | 70 | 70 | 70 | 70 | 70 | 70 | 45 | 70 | 90 |
| Relative transmittance (%) | 106.6 | 113.9 | 114.1 | 115.7 | 113.9 | 110.6 | 107.6 | 96.4 | 113.9 | 94.4 |

In the exemplary embodiment of the liquid crystal display, one organic layer protrusion 41 having the cross shape is disposed at the position corresponding to each sub-pixel electrode 191h and 191l, and the basic region of the sub-pixel electrodes 191h and 191l has four sub-regions, but the invention is not limited thereto or thereby. Alternatively, in another exemplary embodiment of the invention, a plurality of protrusions 41 of the cross shape are formed in one unit pixel and a plurality of basic regions of the field generating electrode described with reference to FIG. 4 may be formed in one pixel area.

Figure 7A:
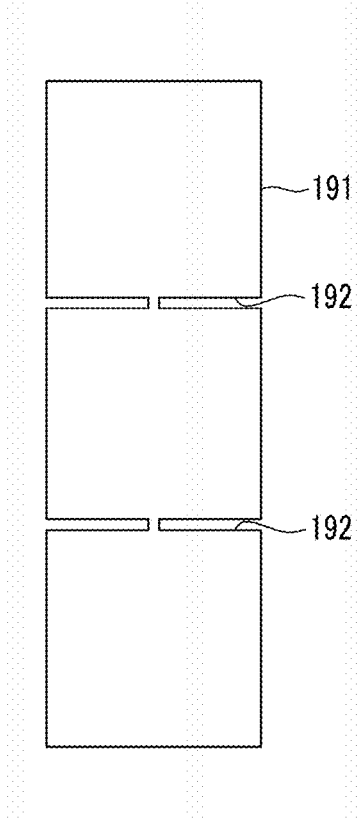
FIGS. 7A and 7B are top plan views of an exemplary embodiment of one pixel area of a liquid crystal display according to the invention.
Figure 7B:
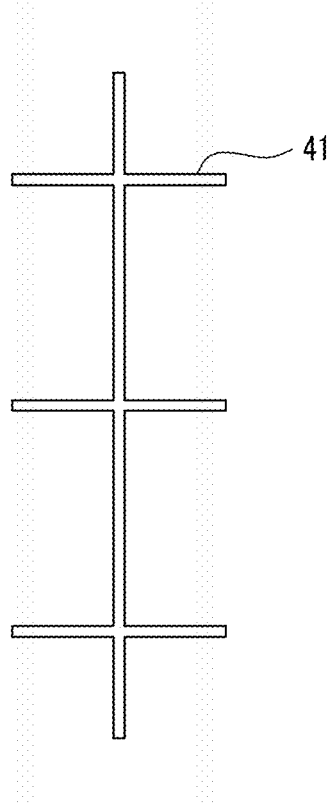

This will be described with reference to FIGS. 7A and 7B and FIGS. 8A and 8B. FIGS. 7A and 7B are top plan views of an exemplary embodiment of one pixel area of a liquid crystal display according to the invention, and FIGS. 8A and 8B are top plan views of another exemplary embodiment of one pixel area of a liquid crystal display according to the invention.

Referring to FIGS. 7A and 7B, the organic layer protrusion 41 corresponding to the pixel electrode 191 disposed in one pixel area has a shape in which three basic cross shapes are combined. The three basic cross shapes may collectively form a single, unitary indivisible organic layer protrusion 41. The pixel electrode 191 may include three basic portions which respectively overlap the three basic cross shapes and form a single, unitary, indivisible pixel electrode 101. Also, the pixel electrode 191 has an edge 192 enclosing the basic cross shape of the organic layer protrusion 41. Accordingly, in one pixel area, three basic regions of the field generating electrode described with reference to FIG. 3 are formed.

Figure 8A:
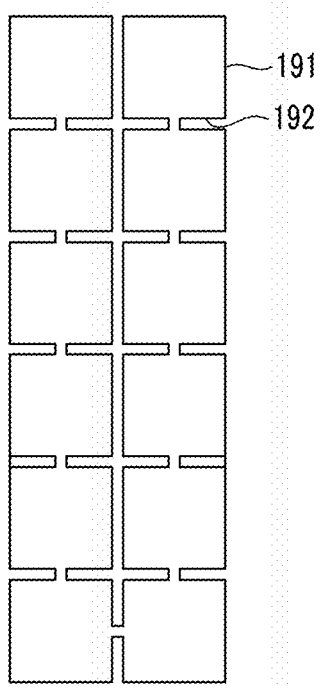
FIGS. 8A and 8B are top plan views of another exemplary embodiment of one pixel area of a liquid crystal display according to the invention.
Figure 8B:
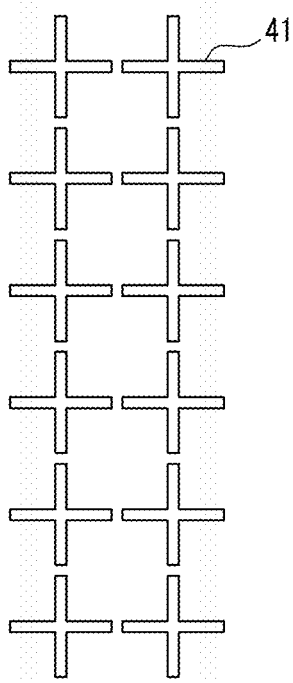

Referring to FIGS. 8A and 8B, the organic layer protrusion 41 corresponding to the pixel electrode 191 disposed in one pixel area collectively includes twelve basic cross shapes separated from each other. Also, the pixel electrode 191 has the edge 192 enclosing the basic cross shapes of the organic layer protrusion. Accordingly, one pixel area includes twelve basic regions of the field generating electrode described with reference to FIG. 3.

Referring to Table 1, in the experimental examples of exemplary embodiments of a liquid crystal display according to the invention, when controlling the pretilt direction of the liquid crystal molecules at the edge of the pixel electrode and at the organic layer protrusion, relative transmittance is mainly over 100% as compared to the conventional pixel electrode including a plurality of micro-slits in the conventional liquid crystal display, thereby confirming the increase of the transmittance for one or more exemplary embodiments according to the invention.

Also, in one or more exemplary embodiment of the liquid crystal display according to the invention, instead of common electrode including the slits with the cross shape, the organic layer protrusion of the cross shape is formed such that the deterioration of production yield according to the alignment error of the slits of the common electrode and the pixel electrode may be reduced or effectively prevented, and the slits are not formed in the common electrode such that the production efficiency of the common electrode panel may be increased.

A transmittance simulation result of the experimental examples of the exemplary embodiments is shown in FIG. 9A to FIG. 9L.

Figure 9A:
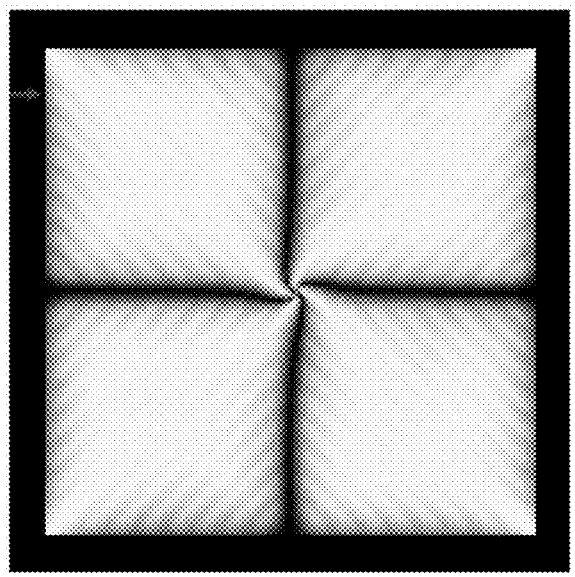
FIG. 9A to FIG. 9L are plan views of an arrangement direction of liquid crystal directors of experimental examples of a liquid crystal display according to the invention.
Figure 9B:
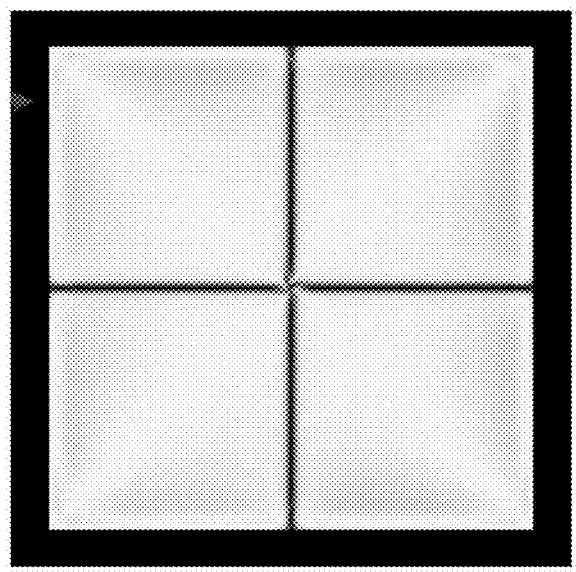
Figure 9C:
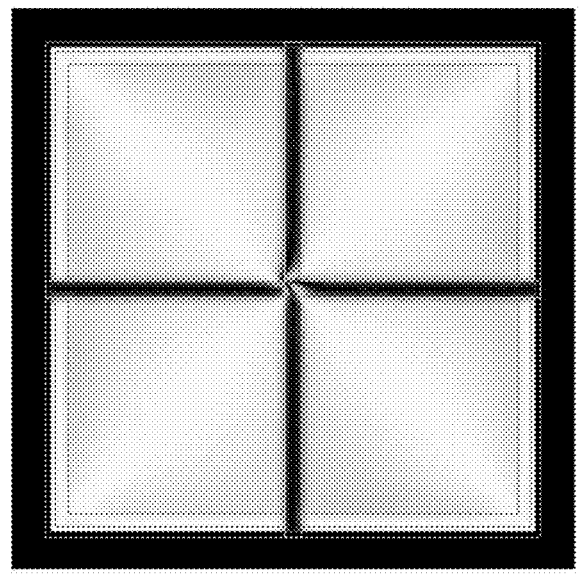
Figure 9D:
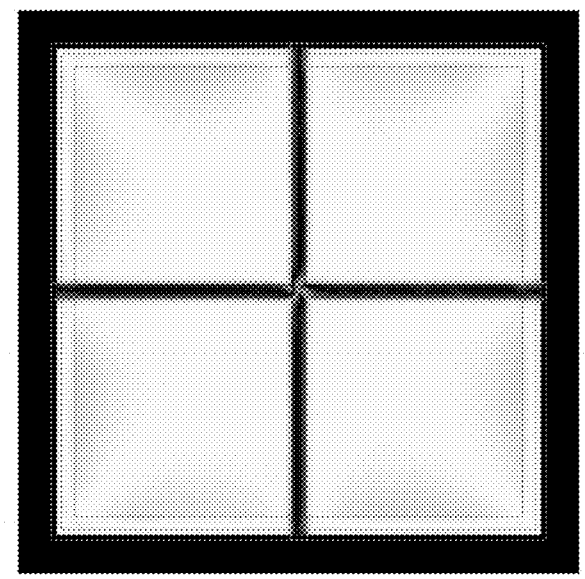
Figure 9E:
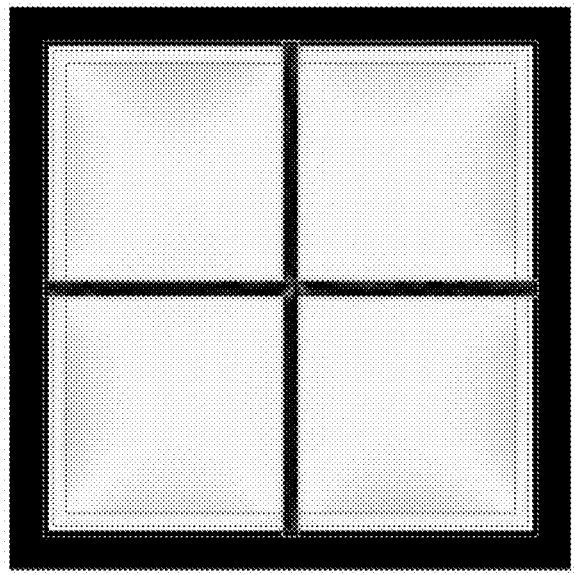
Figure 9F:
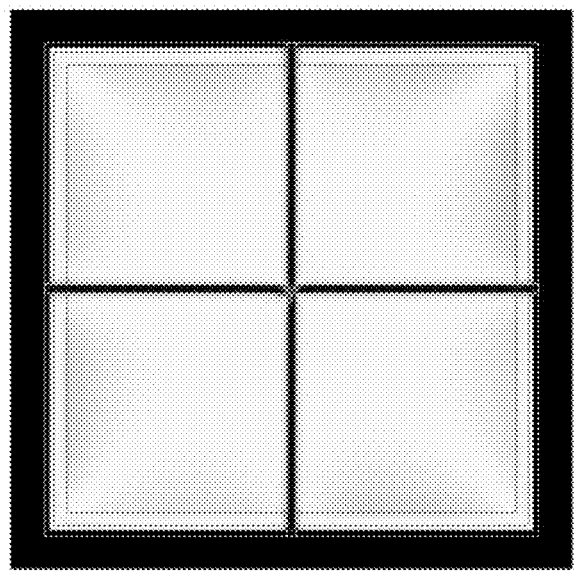
Figure 9G:
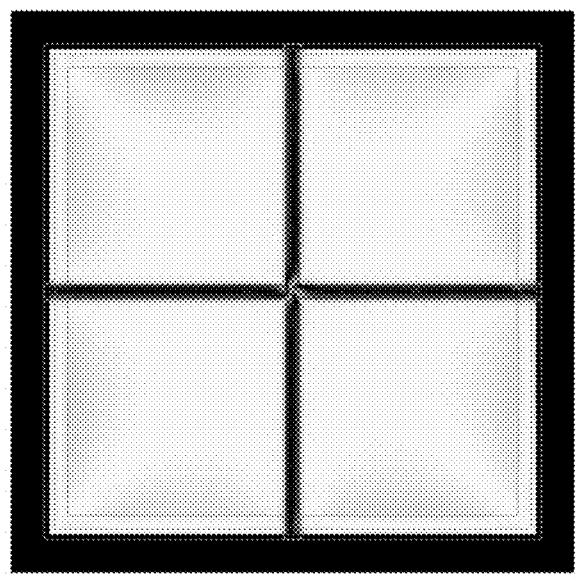
Figure 9H:
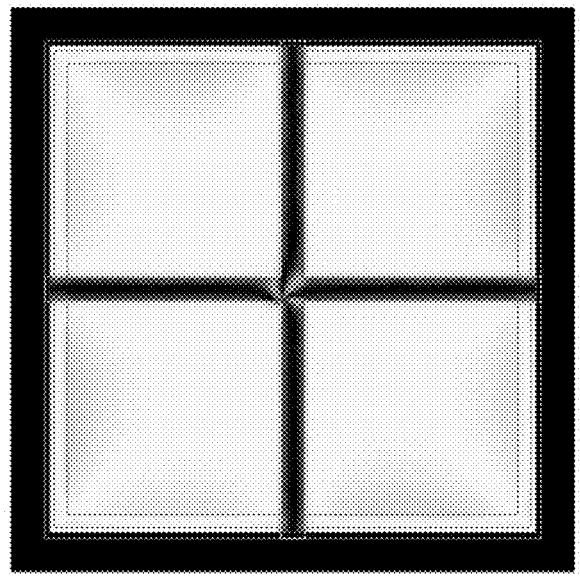
Figure 9I:
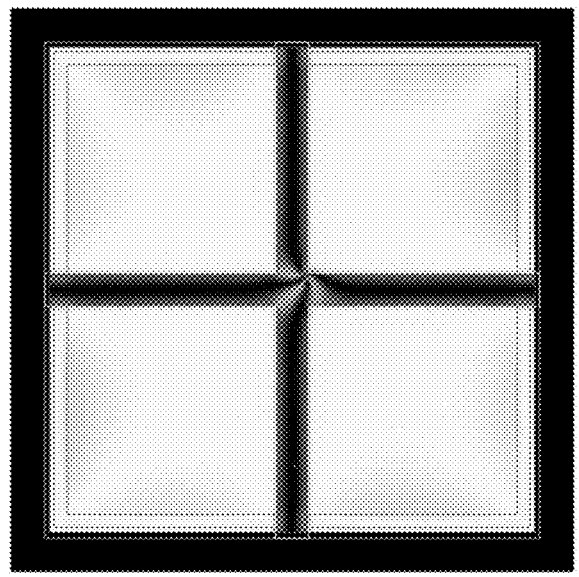
Figure 9J:
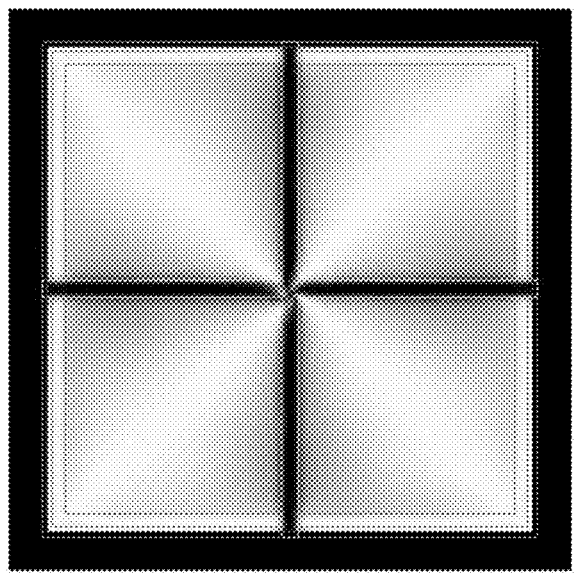
Figure 9K:
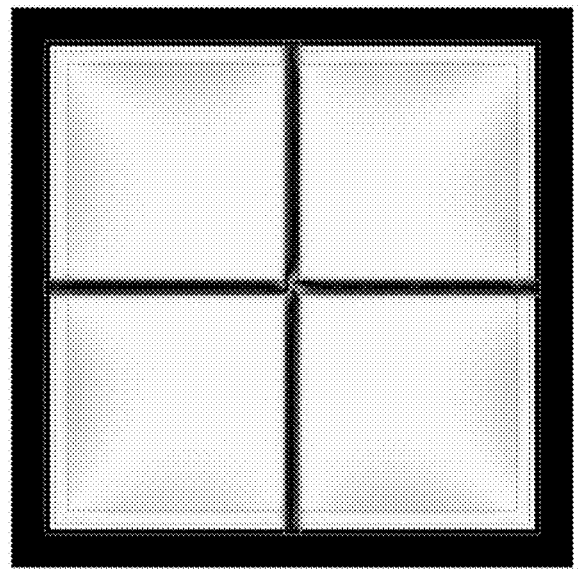
Figure 9L:
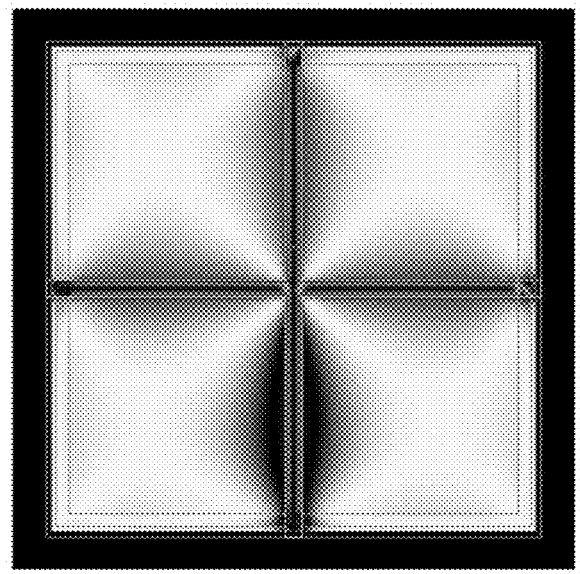

FIG. 9A is a case of forming a plurality of micro-slits in a pixel electrode in a conventional liquid crystal display, and FIG. 9B is a case of forming a slit of a cross shape in a common electrode in a conventional liquid crystal display. FIG. 9C to FIG. 9E sequentially show cases of exemplary embodiments of the invention in which an organic layer protrusion is under a pixel electrode, a width of a protrusion is 5 μm, a taper angle is 70 degrees, and a height of the protrusion is respectively 1.0 μm, 1.5 μm, and 2.0 μm as detailed in Table 1 above. FIG. 9F to FIG. 9I sequentially show exemplary embodiments of the invention in which an organic layer protrusion is under a pixel electrode, a height of a protrusion is 1.5 μm, a taper angle is 70 degrees, and a width of the protrusion is respectively 3 μm, 5 μm, 7.5 μm, and 10 μm as detailed in Table 1 above. FIG. 9J to FIG. 9L sequentially show exemplary embodiments of the invention in which an organic layer protrusion is formed under a pixel electrode, a width of a protrusion is 5 μm, a height of a protrusion 1.5 μm, and a taper angle is respectively 45 degrees, 70 degrees, and 90 degrees as detailed in Table 1 above.

As shown in FIG. 9A to FIG. 9L, in the exemplary embodiments (FIG. 9C to FIG. 9L) of the liquid crystal display according to the invention, the transmittance is high compared with the case (FIG. 9A) of the conventional pixel electrode including a plurality of micro-slits, and the liquid crystal molecules are well arranged in a plurality of directions. Also, compared with the case (FIG. 9B) of the conventional common electrode including the slit of the cross shape, the transmittance is high without a reduction or transmittance, and the liquid crystal molecules are well arranged in a plurality of directions.

Figure 10:
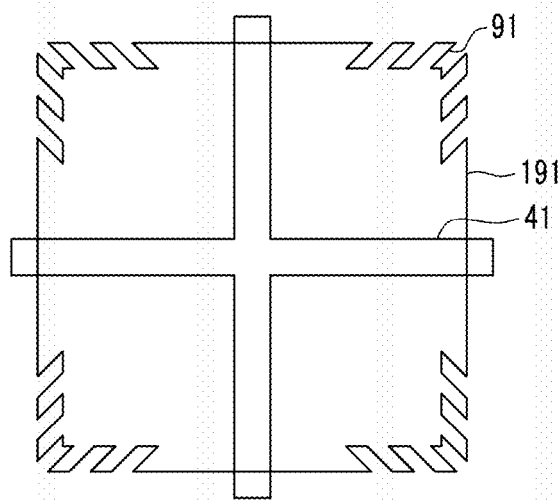
FIG. 10 is a top plan view of another exemplary embodiment of a basic region of a field generating electrode of a liquid crystal display according to the invention.
Figure 12:
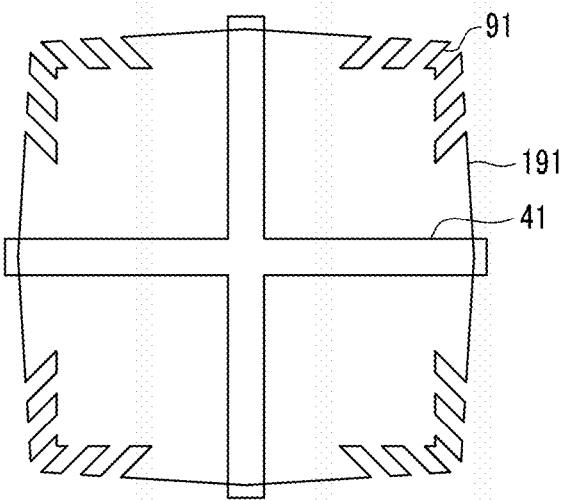
FIG. 12 is a top plan view of another exemplary embodiment of a basic region of a field generating electrode of a liquid crystal display according to the invention.
Figure 13:
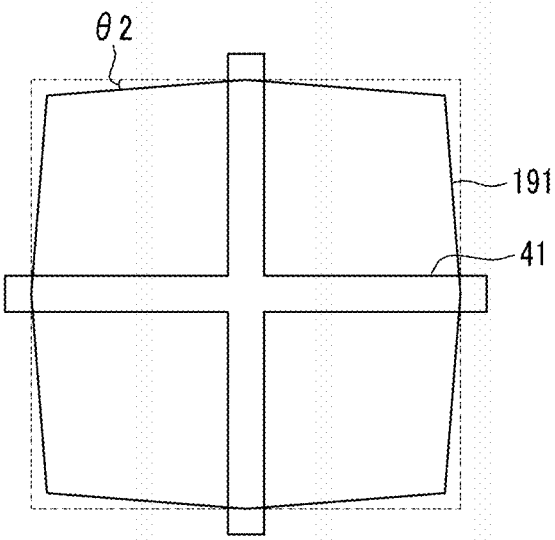
FIG. 13 is a top plan view of another exemplary embodiment of a basic region of a field generating electrode of a liquid crystal display according to the invention.

Next, further exemplary embodiments of a basic region of a field generating electrode of a liquid crystal display will be described with reference to FIG. 10 to FIG. 13. FIG. 10 is a top plan view of another exemplary embodiment of a basic region of a field generating electrode of a liquid crystal display according to the invention, FIG. 11 is a top plan view of another exemplary embodiment of a basic region of a field generating electrode of a liquid crystal display according to the invention, FIG. 12 is a top plan view of another exemplary embodiment of a basic region of a field generating electrode of a liquid crystal display according to the invention, and FIG. 13 is a top plan view of another exemplary embodiment of a basic region of a field generating electrode of a liquid crystal display according to another exemplary embodiment of the invention.

Referring to FIG. 10, in another exemplary embodiment of the basic region of the field generating electrode of the liquid crystal display, the pixel electrode 191 includes a plurality of cutouts 91. The cutout 91 extends in a direction parallel to the direction from the point where two edges of the pixel electrode extending in the different directions meet each other toward the center of the basic region of the field generating electrode. The plurality of cutouts 91 of the pixel electrode 191 strongly guide the arrangement direction of the directors of the liquid crystal molecules. Accordingly, the arrangement of the liquid crystal directors at the edges of the basic region of the field generating electrode may be further induced in the desired direction. That is, the arrangement of the liquid crystal directors may be induced in the direction from the points where two edges of the pixel electrode extending in the different directions meet each other toward the center of the basic region of the field generating electrode.

Figure 11:
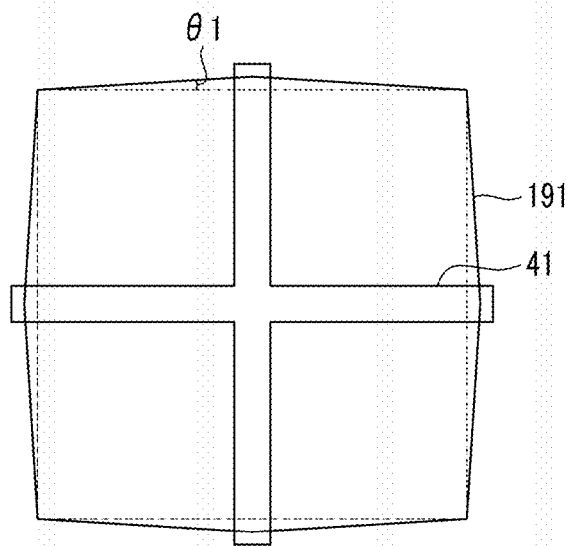
FIG. 11 is a top plan view of another exemplary embodiment of a basic region of a field generating electrode of a liquid crystal display according to the invention.

Referring to FIG. 11, in another exemplary embodiment of the basic region of the field generating electrode of the liquid crystal display, the edges of the pixel electrode 191 are gradually inclined closer to the center of the pixel electrode 191 from the points where two edges extending in the different directions meet each other, with respect to a virtual outline of the planar shape of the pixel electrode 191. In detail, a planar width of the pixel electrode 191 is expanded at the center of the pixel electrode 191, and the inclined edges form a first angle θ1 at the center portion of the pixel electrode. Accordingly, the arrangement of the liquid crystal directors at the edges of the pixel area may be further induced in the desired directions.

In this way, by inclining the edges of the pixel electrode 191 with the predetermined angle θ1 in each sub-region, with reference to a plane surface, the arrangement direction of the liquid crystal directors at the edges of the pixel electrode 191 may also be induced to be toward the direction that the liquid crystal directors are finally inclined. Accordingly, the arrangement of the liquid crystal directors at the edges of the pixel area may be induced in the desired directions. That is, the arrangement of the liquid crystal directors may be induced from the points where two edges of the pixel electrode extending in the different directions meet each other toward the center portion of the basic region of the field generating electrode.

Next, referring to FIG. 12, in another exemplary embodiment of the basic region of the field generating electrode of the liquid crystal display, like the exemplary embodiment of FIG. 10, the pixel electrode 191 includes a plurality of cutouts 91. The cutout 91 extends in a direction parallel to the direction from each points where two edges of the pixel electrode 191 extending in the different directions meet each other toward the center portion of the basic region of the field generating electrode. Simultaneously, the edges of the pixel electrode 191 are gradually inclined in a direction closer to the center of the pixel electrode 191 from the points where the two edges extending in the different directions meet each other, with respect to a virtual outline of the planar shape of the pixel electrode 191. In detail, the width of the pixel electrode is expanded where the inclined edges form the first angle θ1. Accordingly, the arrangement of the liquid crystal directors in the edges of the pixel area may be further induced in the desired directions.

Referring to FIG. 13, in another exemplary embodiment of the basic region of the field generating electrode of the liquid crystal display, the edges of the pixel electrode 191 are inclined in a direction closer to the point where two edges extending in the different directions meet each other from the center of the pixel electrode 191, with respect to a virtual outline of the planar shape of the pixel electrode 191. In detail, the width of the pixel electrode is decreased at the meeting points of the pixel electrode 191 edges where the inclined edges form a second angle θ2. In this way, by inclining the edges of the pixel electrode 191 with the predetermined angle θ2 in each sub-region, with reference to a plane surface, the arrangement directions of the liquid crystal directors at the edges of the pixel electrode 191 may also be induced to be toward the direction that the liquid crystal directors are finally inclined. Accordingly, the arrangement of the liquid crystal directors at the edges of the pixel area may be induced in the desired directions. That is, the arrangement of the liquid crystal directors may be induced from the points where the edges of the pixel electrode 191 extending in the different directions meet each other toward the center portion of the basic region of the field generating electrode.

In one or more exemplary embodiments of the liquid crystal display according to the invention, by using the fringe field at the edge of the pixel electrode and at the organic layer protrusion, the liquid crystal molecules may be arranged while having the pretilt in the different directions. Accordingly, compared with a case of a conventional pixel electrode including a plurality of micro-slits, the aperture ratio of the liquid crystal display may be increased. Also, instead of the common electrode including slits, there is no production yield decrease according to a misalignment of the slits of the common electrode and the pixel electrode, and a yield deterioration of a common electrode panel generated when the common electrode includes the slits may be reduced or effectively prevented.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
a first substrate;
a pixel electrode on the first substrate;
a second substrate which faces the first substrate;
a common electrode on the second substrate;
a liquid crystal layer between the first substrate and the second substrate, and comprising liquid crystal molecules; and
a cross-shaped organic layer protrusion on the first substrate or the second substrate, the cross-shaped organic layer protrusion overlapping the pixel electrode comprising:
a first portion elongated in a first direction, and
a second portion elongated in a second direction inclined with a first direction,
wherein
distal ends of the cross-shaped organic layer protrusion protrude further than an edge of the pixel electrode, in a plan view,
the first and second directions are each substantially perpendicular to the edge of the pixel electrode from which the distal ends of the cross-shaped organic layer protrusion further protrude, and
wherein the cross-shaped organic layer protrusion is on the first subtrate and is directly under the pixel electrode.

2. The liquid crystal display of claim 1, further comprising:
a first alignment layer on the first substrate; and
a second alignment layer on the second substrate,
wherein one of the liquid crystal layer, the first alignment layer and the second alignment layer includes a photoreactive material.

3. The liquid crystal display of claim 2, wherein
long axes of the liquid crystal molecules of the liquid crystal layer are approximately perpendicular to surfaces of the first substrate and the second substrate in the absence of an electric field in the liquid crystal layer.

4. The liquid crystal display of claim 3, wherein
the liquid crystal molecules of the liquid crystal layer are pretilted in a direction parallel to a direction extending from a position at which two adjacent edges of the pixel electrode meet each other toward a center portion of the cross-shaped organic layer protrusion.

5. The liquid crystal display of claim 4, wherein
the pixel electrode is divided into a plurality of sub-regions by edges of the pixel electrode and the cross-shaped organic layer protrusion, and in the sub-regions, the liquid crystal molecules of the liquid crystal layer are pretilted in different directions.

6. The liquid crystal display of claim 1, further comprising:
a first alignment layer on the first substrate; and
a second alignment layer on the second substrate,
wherein one of the liquid crystal layer, the first alignment layer and the second alignment layer includes a photoreactive material.

7. The liquid crystal display of claim 6, wherein
long axes of the liquid crystal molecules of the liquid crystal layer are approximately perpendicular to surfaces of the first substrate and the second substrate in the absence of an electric field in the liquid crystal layer.

8. The liquid crystal display of claim 7, wherein
the liquid crystal molecules of the liquid crystal layer are pretilted in a direction parallel to a direction extending from a position at which two adjacent edges of the pixel electrode meet each other toward a center portion of the cross-shaped organic layer protrusion.

9. The liquid crystal display of claim 8, wherein
the pixel electrode is divided into a plurality of sub-regions by edges of the pixel electrode and the cross-shaped organic layer protrusion, and in the sub-regions, the liquid crystal molecules of the liquid crystal layer are pretilted in different directions.

10. The liquid crystal display of claim 1, wherein
long axes of the liquid crystal molecules of the liquid crystal layer are approximately perpendicular to surfaces of the first substrate and the second substrate in the absence of an electric field in the liquid crystal layer.

11. The liquid crystal display of claim 10, wherein
the liquid crystal molecules of the liquid crystal layer are pretilted in a direction parallel to a direction extending from a position at which two adjacent edges of the pixel electrode meet to each other toward a center portion of the cross-shaped organic layer protrusion.

12. The liquid crystal display of claim 11, wherein:
the pixel electrode is divided into a plurality of sub-regions by edges of the pixel electrode and the cross-shaped organic layer protrusion, and in the sub-regions, the liquid crystal molecules of the liquid crystal layer are pretilted in different directions.

13. The liquid crystal display of claim 1, wherein:
the liquid crystal molecules of the liquid crystal layer are pretilted in a direction parallel to a direction extending from a position at which two adjacent edges of the pixel electrode meet each other toward a center portion of the cross-shaped organic layer protrusion.

14. The liquid crystal display of claim 13, wherein
the pixel electrode is divided into a plurality of sub-regions by edges of the pixel electrode and the cross-shaped organic layer protrusion, and in the sub-regions, the liquid crystal molecules of the liquid crystal layer are pretilted in different directions.

15. The liquid crystal display of claim 1, wherein
the pixel electrode comprises a cutout at a position at which two adjacent edges of the pixel electrode meet, and
the cutout extends in a direction from the position at which the two adjacent edges of the pixel electrode meet toward a center portion of the cross-shaped organic layer protrusion.

16. The liquid crystal display of claim 1, wherein
a width of the pixel electrode gradually increases from edges of the pixel electrode to a center portion of the pixel electrode.

* * * * *